United States Patent
Asada

(10) Patent No.: US 8,493,635 B2
(45) Date of Patent: Jul. 23, 2013

(54) OPTICAL READING DEVICE, CONTROL METHOD FOR AN OPTICAL READING DEVICE, AND COMPUTER-READABLE RECORDING MEDIUM STORING A CONTROL PROGRAM FOR AN OPTICAL READING DEVICE

(75) Inventor: Kenji Asada, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 282 days.

(21) Appl. No.: 12/987,806

(22) Filed: Jan. 10, 2011

(65) Prior Publication Data
US 2011/0170150 A1 Jul. 14, 2011

(30) Foreign Application Priority Data
Jan. 13, 2010 (JP) ................. 2010-004569

(51) Int. Cl.
G06K 1/00 (2006.01)
G06K 15/00 (2006.01)
G06K 9/40 (2006.01)
G06F 3/12 (2006.01)
H04N 1/40 (2006.01)
H04N 1/04 (2006.01)

(52) U.S. Cl.
USPC ......... 358/474; 358/444; 358/1.12; 358/1.15; 358/1.13; 358/1.9; 382/275

(58) Field of Classification Search
USPC ............... 358/474, 444, 1.12, 1.15, 1.9, 468, 358/406; 382/275
See application file for complete search history.

(56) References Cited

U.S. PATENT DOCUMENTS

| 2004/0130750 | A1 | 7/2004 | Ushida et al. |
| 2006/0082813 | A1* | 4/2006 | Martin et al. ................. 358/1.15 |
| 2008/0266617 | A1* | 10/2008 | Suzuki ........................... 358/474 |
| 2009/0303551 | A1* | 12/2009 | Okada ............................ 358/474 |

FOREIGN PATENT DOCUMENTS

| JP | 2002-044435 | 2/2002 |
| JP | 2004-220585 | 8/2004 |
| JP | 2006-246410 | 9/2006 |
| JP | 2009-153052 | 7/2009 |

* cited by examiner

Primary Examiner — Charlotte M Baker
Assistant Examiner — Rury Grisham

(57) ABSTRACT

Unintended image inversion is prevented when an optical reading device processes images captured by an optical reading device that uses a linear image sensor having the photodetectors arrayed in a line. An optical reading unit has a linear image sensor with photodetectors arrayed perpendicularly to the transportation direction of the recording medium S to be scanned, optically reads the conveyed recording medium by means of the linear image sensor, and sequentially outputs the detection values of the photodetectors from an end of the linear image sensor. A gate array and CPU generate scanned image data based on the detection values read by the optical reading unit, add thereto information describing the relationship between the scanning sequence of the photodetectors of the linear image sensor and the pixel order of the scanned image data, and output to another device.

14 Claims, 11 Drawing Sheets

FIG. 9A | SOH | IDENTIFICATION CODE | NUL |

FIG. 9B | SOH | AREA NUMBER | SIDE INFORMATION | TRANSPORTATION DIRECTION | DATA SEQUENCE | ... | SCANNED IMAGE DATA | NUL |

(HEADER spans from AREA NUMBER through DATA SEQUENCE)

FIG. 9C | SOH | IDENTIFICATION CODE | FINAL READ RESULT | NUL |

FIG. 9D | SOH | STATUS | SIDE INFORMATION | DATA SEQUENCE | ... | NUL |

OPTICAL READING DEVICE, CONTROL METHOD FOR AN OPTICAL READING DEVICE, AND COMPUTER-READABLE RECORDING MEDIUM STORING A CONTROL PROGRAM FOR AN OPTICAL READING DEVICE

CROSS-REFERENCE TO RELATED APPLICATION

Japanese Patent Application No. 2010-004569 filed on Jan. 13, 2010 is hereby incorporated by reference in its entirety.

BACKGROUND

1. Technical Field

The present invention relates to an optical reading device that conveys a medium and optically reads the surface of the medium, to a method of controlling the optical reading device, and to a computer-readable recording medium storing a control program for an optical reading device.

2. Related Art

Scanners and other types of optical reading devices that optically read sheet media, and use a linear image sensor having photodetectors arrayed in a line to read the media one line at a time, are known from the literature. See, for example, Japanese Unexamined Patent Appl. Pub. JP-A-2005-79854.

A linear image sensor generally reads (outputs) the detection values of the photodetectors arrayed in a line sequentially from one end or the other end of the line. Whether the values are read from the one end or the other end of the image sensor is individually set for the optical reading device. However, if the direction in which the values are read is not known to the process that generates an image based on the output values of the linear image sensor, or the process that outputs the generated image data, the image may be unintentionally inverted. As a result, the host computer connected to the optical reading device has conventionally run a program that is written based on the scanning direction of the linear image sensor of the optical reading device, and can only process the captured image data according to the output specifications of the linear image sensor.

SUMMARY

An optical reading device according to the invention is directed to solving this problem, and can prevent unintended image inversion when processing images captured by an optical reading device that uses a linear image sensor having the photodetectors arrayed in a line.

A first aspect of the invention is an optical reading device including: a transportation unit that conveys a medium to be scanned; an optical reading unit that has a linear image sensor with photodetectors arrayed perpendicularly to the transportation direction of the medium, optically senses the medium conveyed by the transportation unit by the linear image sensor, and sequentially outputs the detection values of the photodetectors from either end of the linear image sensor; and an image processing unit that generates scanned image data based on the detection values read by the optical reading unit, adds thereto information describing the relationship between the scanning sequence of the photodetectors of the linear image sensor and the pixel order of the scanned image data, and outputs to another device.

This aspect of the invention adds to the scanned image data information describing the relationship between the order of (the scanning sequence) of the photodetectors of the linear image sensor and the pixel order of the scanned image data, and outputs to another device. Based on this information added to the scanned image data, the other device connected to the optical reading device can therefore accurately determine whether the order of the pixels in the scanned image data is the same as or is the reverse of the order of the photodetectors in the linear image sensor. Detection values can therefore be read from one end or the other end of the photodetectors arrayed in a line in the linear image sensor. As a result, the scanned image data can be processed in the correct orientation without using a program specifically written to match the scanning direction of the linear image sensor, and unintended image inversion can be prevented. In addition, the top, the bottom, or both the top and bottom of the medium can be scanned.

In an optical reading device according to another aspect of the invention, the image processing unit includes a detection value processing unit that generates pixel data based on the photodetector detection values output from the optical reading unit, and outputs the generated pixel values in the same order or the reverse order as the photodetector reading sequence of the linear image sensor, and an image generating unit that generates the scanned image data based on the pixel data output by the detection value processing unit.

Because this aspect of the invention generates pixel data based on the photodetector detection values output from the optical reading unit, outputs the generated pixel values in the same order or the reverse order as the photodetector reading sequence of the linear image sensor, and generates the scanned image data based on the pixel data output by the detection value processing unit, scanned image data can be generated with the pixels arranged in the opposite order as the reading sequence of the photodetectors in the linear image sensor. As a result, scanned image data can be generated and output with the pixel data arranged in the desired direction without being limited to the scanning direction of the linear image sensor.

In an optical reading device according to another aspect of the invention, the optical reading unit has disposed on opposite sides of the transportation path a first scanning unit that reads one side of the medium and a second scanning unit that reads the other side of the medium, the first and second scanning units each having a linear image sensor as described above. In addition, the image processing unit adds information describing the relationship between the scanning sequence of the photodetectors of the linear image sensor in the first scanning unit and the order of the pixels in the scanned image data to the scanned image data from the first scanning unit, adds information describing the relationship between the scanning sequence of the photodetectors of the linear image sensor in the second scanning unit and the order of the pixels in the scanned image data to the scanned image data from the second scanning unit, and outputs to the other device.

When both sides of the scanned medium are scanned by the first and second scanning units in this aspect of the invention, information describing the relationship between the order (scanning sequence) of the photodetectors of the linear image sensor and the order of the pixels in the scanned image data is added to and output with the scanned image data from both the first and second scanning unit. As a result, because the pixel sequence can be separately set for the scanned image data captured from one side of the medium and the scanned image data captured from the other side of the medium, scanned image data of both the top and bottom sides of the medium can be suitably acquired according to the application and processing of the scanned image data, including, for example, acquiring an inverted image of only one side for security.

In an optical reading device according to another aspect of the invention, the image processing unit has a storage unit that stores the generated scanned image data, and reads from the storage unit and outputs to the other device a scanned image of the area where scanning was completed even if scanning another area is not completed when one or a plurality of areas set in the scanning range of the optical reading unit is scanned by the optical reading unit and scanning at least one area ends.

When a plurality of areas set in the scanning range are optically scanned, the scanned image data is stored, and scanning at least one area is completed, this aspect of the invention sends the scanned image data from the area for which scanning ended to another device even if there is another area where scanning is not completed. Transmission therefore does not need to wait until scanning all areas is completed. As a result, the delay related to transmitting the scanned image data can be shortened, thereby increasing throughput and improving convenience. In addition, scanning is not inhibited when the storage capacity of the storage unit that stores the scanned image data is small.

An optical reading device according to another aspect of the invention also has a response control unit that sends information describing the scanning direction of the linear image sensor to the other device in response to a request from the other device.

This aspect of the invention enables another device connected to the optical reading device to easily acquire information related to the direction in which the detection values of the linear image sensor were read. As a result, the device that processes the image data captured by the optical reading device can correctly process the image data according to the scanning direction, and can prevent unintended image inversion.

Another aspect of the invention is an optical reading device control method that controls an optical reading device that includes a transportation unit that conveys a medium to be scanned, and an optical reading unit that has a linear image sensor with photodetectors arrayed perpendicularly to the transportation direction of the medium, optically reads the medium conveyed by the transportation unit by the linear image sensor, and sequentially reads and outputs the detection values of the photodetectors from either end of the linear image sensor. The control method includes steps of: generating scanned image data based on the detection values read by the optical reading unit; adding to the scanned image data information describing the relationship between the scanning sequence of the photodetectors of the linear image sensor and the pixel order of the scanned image data; and outputting to another device.

By executing the control method according to another aspect of the invention, information describing the relationship between the order of (the scanning sequence) of the photodetectors of the linear image sensor and the pixel order of the scanned image data is added to the scanned image data and output to another device. Based on this information added to the scanned image data, the other device connected to the optical reading device can therefore accurately determine whether the order of the pixels in the scanned image data is the same as or is the reverse of the order of the photodetectors in the linear image sensor. As a result, the scanned image data can be processed in the correct orientation without using a program specifically written to match the scanning direction of the linear image sensor, and unintended image inversion can be prevented.

Another aspect of the invention is a computer-readable recording medium that stores a program that can be executed by a control unit that controls an optical reading device that has a transportation unit that conveys a medium to be scanned, and an optical reading unit that has a linear image sensor with photodetectors arrayed perpendicularly to the transportation direction of the medium, optically senses the medium conveyed by the transportation unit by the linear image sensor, and sequentially outputs the detection values of the photodetectors from either end of the linear image sensor. The program causes the control unit to execute steps of: generating scanned image data based on the detection values read by the optical reading unit; adding to the scanned image data information describing the relationship between the scanning sequence of the photodetectors of the linear image sensor and the pixel order of the scanned image data; and outputting to another device.

By executing the program of the invention, the control unit adds information describing the relationship between the order of (the scanning sequence) of the photodetectors of the linear image sensor and the pixel order of the scanned image data to the scanned image data and output to another device. Based on this information added to the scanned image data, the other device connected to the optical reading device can therefore accurately determine whether the order of the pixels in the scanned image data is the same as or is the reverse of the scanning sequence of the photodetectors in the linear image sensor. As a result, the scanned image data can be processed in the correct orientation without using a program specifically written to match the scanning direction of the linear image sensor, and unintended image inversion can be prevented.

Effect of the Invention

As described above, the invention enables another device connected to the optical reading device to accurately determine the direction in which the detection values of the linear image sensor were read and process the scanned image data in the correct orientation, thereby preventing unintended image inversion, for example.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 9 schematically describes the data structure of the scanned image data.

DESCRIPTION OF EMBODIMENTS

A preferred embodiment of the present invention is described below with reference to the accompanying figures.

Figure 1:
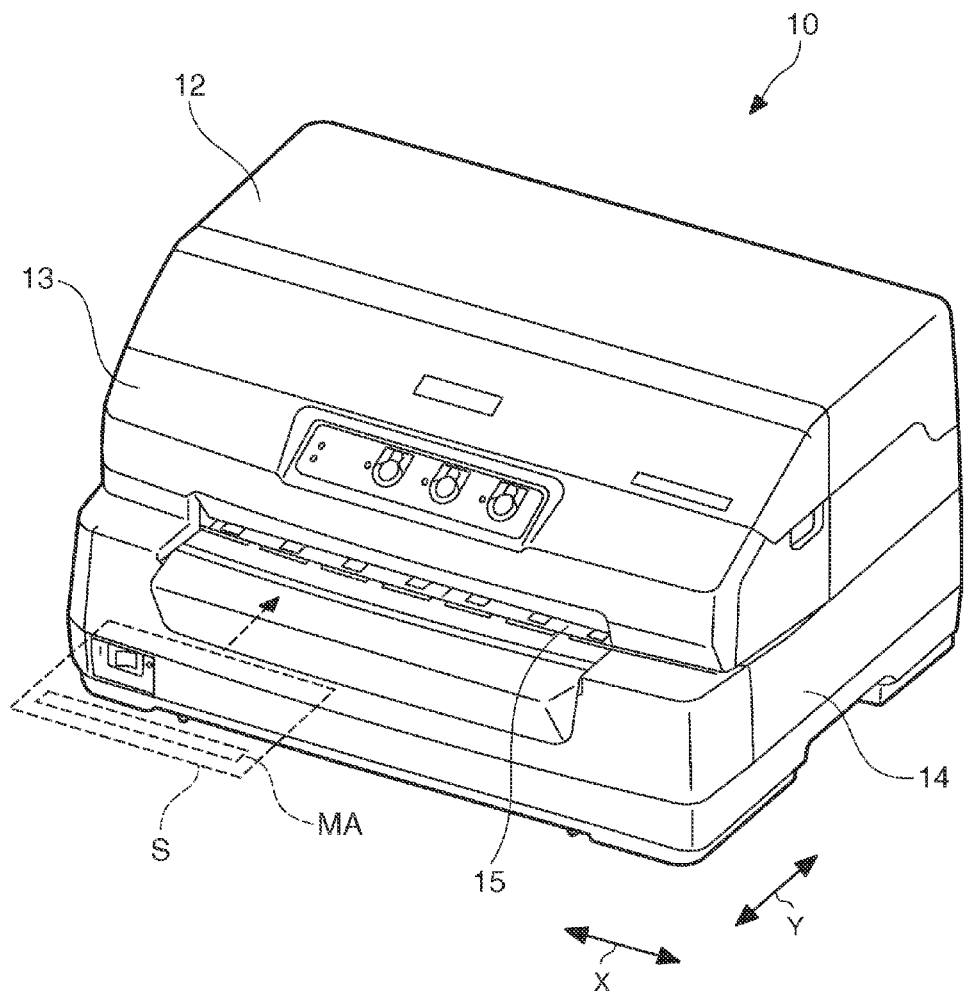
FIG. 1 is an external oblique view of a dot impact printer according to a preferred embodiment of the invention.
Figure 2:
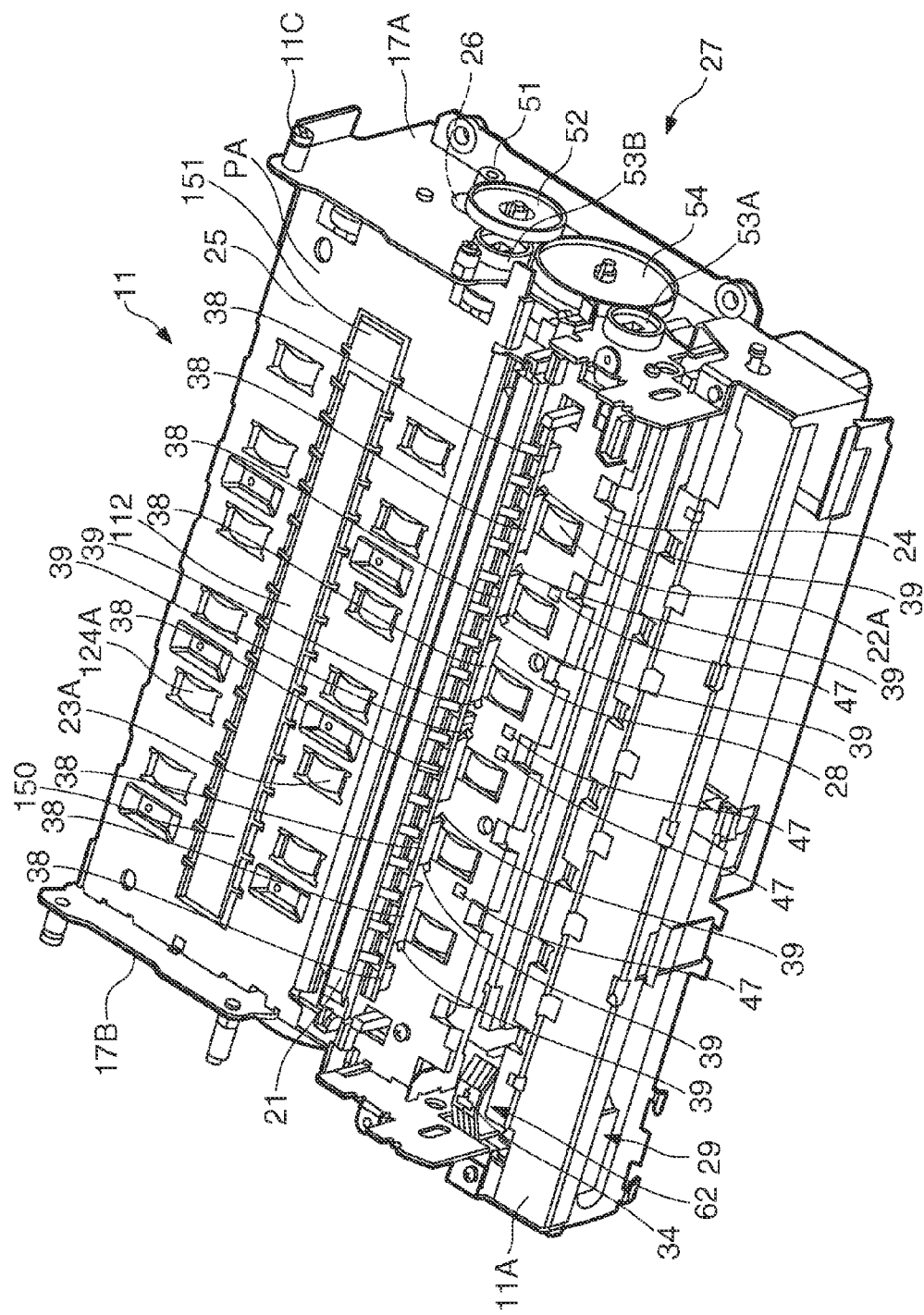
FIG. 2 is an oblique view of the print assembly.
Figure 3:
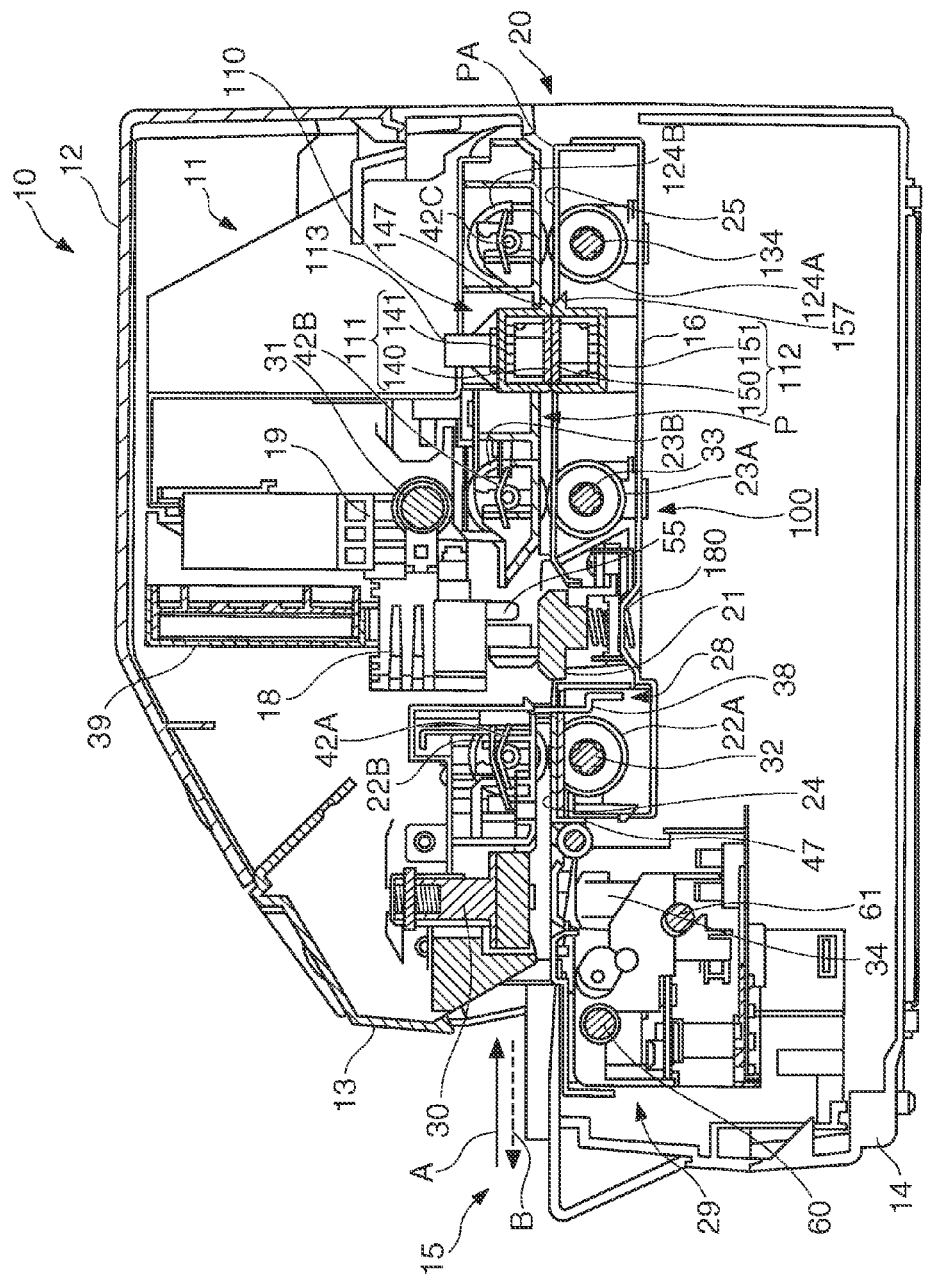
FIG. 3 is a side section view of the print assembly.

FIG. 1 is a front oblique view showing the appearance of a dot impact printer according to a preferred embodiment of the invention. FIG. 2 is an oblique view of the print assembly 11. FIG. 3 is a side section view of the dot impact printer 10 in FIG. 1.

The dot impact printer 10 shown in FIG. 1 records images, including text, by driving plural recording wires of a recording head 18 (see FIG. 3) against a recording medium S with an ink ribbon (not shown in the figure) delivered from a ribbon cartridge (not shown in the figure) therebetween in order to form dots on the recording surface of the recording medium S. The dot impact printer 10 has an optical reader (scanner) 110 (FIG. 3) and thus also functions as an optical reading device that can optically read text, symbols, images, and other content presented on the surface of the recording medium S.

Cut-sheet media that is precut to a certain length, and continuous media having numerous sheets connected in a continuous web, are examples of recording media S (media) that can be used in the dot impact printer 10. Cut-sheet media include, for example, single slips and multipart forms, passbooks, postcards, and letters. Continuous media include continuous multipart form paper and perforated fanfold paper. In this embodiment of the invention checks and promissory notes (collectively referred to as simply checks herein) issued on a bank account, for example, and passbooks issued by a bank or other financial institution, are used as the recording medium S.

Checks are slips on which MICR (magnetic ink character recognition) information containing the user's account number and a serial check number, for example, are printed in a MICR area MA on the check surface. A passbook is a bound booklet of plural blank pages that can be printed on when the passbook is open. A magnetic stripe is typically rendered on the outside surface of one of the passbook covers.

Note that of the four sides of a rectangular recording medium S, the edge on the side that is inserted to the dot impact printer 10 is referred to herein as the leading edge or end, and the edge on the opposite side as the leading end is referred to as the trailing edge or end.

As shown in FIG. 1, the dot impact printer 10 has a top cover 12, a top case 13, and a bottom case 14 as outside case members, and a manual insertion opening 15 in the front of the top case 13 and bottom case 14 where the recording medium S is inserted and discharged. A paper exit 20 from which the recording medium S may be discharged is also formed at the back of the top case 13 and bottom case 14. Whether the recording medium S processed by the dot impact printer 10 is discharged from the manual insertion opening 15 or the paper exit 20 is controlled by a command sent to the dot impact printer 10 from the host computer 200 described below.

The side where the manual insertion opening 15 is rendered, that is, the left side as seen in FIG. 3, is referred to herein as the front, and the side where the paper exit 20 is rendered, that is, the right side in FIG. 3, is referred as the rear or back.

As shown in FIG. 2, the dot impact printer 10 has a print assembly 11 that is covered by the foregoing case members. The print assembly 11 includes a bottom chassis part 11A and a top chassis part (not shown in the figure) that is supported by pins 11C at the back of the bottom chassis part 11A. The top chassis part can pivot by operating a lever (not shown in the figure) disposed on the left side of the top chassis part, and the inside of the print assembly 11 is exposed when the top chassis part pivots open.

As shown in FIG. 2 and FIG. 3, the print assembly 11 includes a base frame 16 and a right side frame 17A and left side frame 17B pair attached to the sides of the base frame 16. The side frames (not shown in the figure) of the top case chassis part are disposed on the outside of the side frames 17A and 17B with a carriage guide shaft 31 spanning therebetween and a flat front media guide 24 and rear media guide 25 affixed between the side frames 17A and 17B. A flat platen 21 is disposed between the front media guide 24 and rear media guide 25, and the recording head 18 is disposed above the platen 21 facing the platen 21.

The recording head 18 is mounted on a carriage 19 that is fit freely slidably on the carriage guide shaft 31. The carriage 19 is driven through an intervening timing belt (not shown in the figure) by the forward or reverse rotation of a carriage drive motor 56 (FIG. 4) that drives the carriage 19, and the carriage 19 thus moves reciprocally guided by the carriage guide shaft 31. The carriage 19 scans bidirectionally between the side frames of the top chassis part in the direction indicated by arrow X in FIG. 1, that is, in the main scanning direction aligned with the axial direction of the carriage guide shaft 31 and the long side of the platen 21. Note that the direction perpendicular to the main scanning direction X of the carriage 19, that is, the direction indicated by arrow Y in FIG. 1, is the subscanning direction.

While the recording head 18 carried on the carriage 19 travels in the main scanning direction with the carriage 19, recording wires are pushed out from the wire face (not shown in the figure) on the distal end of the recording head 18 opposite the platen 21 to strike the ink ribbon and transfer ink from the ink ribbon to the recording medium S conveyed between the platen 21 and the recording head 18, and record an image, which may include text, on the recording medium S. The ink ribbon is stored folded up inside a ribbon cartridge (not shown in the figure) that is mounted on the main frame or the carriage 19, and is delivered to the recording head 18 while the carriage 19 scans the recording medium. As shown in FIG. 3, a media width sensor 55 is disposed behind the recording head 18 at a position above the platen 21. The media width sensor 55 is mounted on the carriage 19 and travels with the carriage 19 over the platen 21, and is used to determine the positions of the side edges of the recording medium S and the width of the recording medium S.

As shown in FIG. 2 and FIG. 3, the platen 21 is flat and extends in the scanning direction of the carriage 19, and is urged toward the recording head 18 and elastically supported by an urging spring 180. The urging spring 180 is a compression spring, and the striking force of the recording wires during the recording operation of the recording head 18 is assisted by the urging force of the urging spring 180. When the thickness of the recording medium S varies while the recording medium S is conveyed, or when recording media S of different thicknesses are conveyed to the print assembly 11, the platen 21 is pushed by the distal end of the recording head 18 in resistance to the urging force of the urging spring 180 and moves away from the recording head 18. As a result, the gap between the distal end of the recording head 18 and the recording surface of the recording medium S is held constant regardless of the thickness of the recording medium.

As shown in FIG. 3, the printer assembly 11 includes a media transportation mechanism (transportation means) 100 that conveys the recording medium S, an alignment mechanism 28 that contacts the leading end of the recording medium S conveyed by the media transportation mechanism 100 and aligns the recording medium S, a magnetic data reading unit 29 having a magnetic head 34 that reads the MICR information printed on a check or reads or writes magnetic information in the magnetic stripe on a passbook, and a media pressure unit 30 that pushes down on the recording medium S to prevent the recording medium S from lifting up during magnetic information processing, including when the magnetic head 34 of the magnetic data reading unit 29 reads the MICR information.

As shown in FIG. 2 and FIG. 3, the media transportation mechanism 100 includes the platen 21, a first drive roller 22A, a first follower roller 22B, a second drive roller 23A, a second follower roller 23B, a third drive roller 124A, a third follower roller 124B, the front media guide 24, the rear media guide 25, a media transportation motor 26, and a drive wheel train 27. The media transportation mechanism 100 renders a transportation path P through which the recording medium S is conveyed over the front media guide 24 and rear media guide 25. The tops of the front media guide 24 and rear media guide 25 are conveyance surface PA of the transportation path P.

In this embodiment of the invention the first drive roller 22A and first follower roller 22B are disposed on the front side of the printer assembly 11 relative to the platen 21 and recording head 18, and the second drive roller 23A and second follower roller 23B pair, and third drive roller 124A and third follower roller 124B pair, are disposed sequentially on the rear side of the printer assembly 11 relative to the platen 21 and recording head 18.

The first drive roller 22A and first follower roller 22B are disposed as a roller pair one above the other, the second drive roller 23A and second follower roller 23B are disposed as a roller pair one above the other, and the third drive roller 124A and third follower roller 124B are disposed as a roller pair one above the other.

The first drive roller 22A, second drive roller 23A, and third drive roller 124A are drive rollers that are driven rotationally by the media transportation motor 26 and drive wheel train 27. The first follower roller 22B, second follower roller 23B, and third follower roller 124B are follower rollers that are urged by springs 42A, 42B, and 42C with specific pressure to the first drive roller 22A, second drive roller 23A, and third drive roller 124A side, respectively. As a result, the first drive roller 22A and first follower roller 22B are rotationally driven in mutually opposite directions, the second drive roller 23A and second follower roller 23B are rotationally driven in mutually opposite directions, and the third drive roller 124A and third follower roller 124B are rotationally driven in mutually opposite directions.

The drive wheel train 27 is disposed on the outside of the right side frame 17A as shown in FIG. 2. The drive wheel train 27 has a motor pinion 51 that is affixed to rotate in unison with the drive shaft of the media transportation motor 26, which can rotate in forward and reverse directions. Drive power from the motor pinion 51 is transferred through a speed reducing gear 52 to a second drive gear 53B affixed to the second roller shaft 33 of the second drive roller 23A, and is transferred from this second drive gear 53B through an intermediate gear 54 to a first drive gear 53A affixed to the first roller shaft 32 of the first drive roller 22A.

Torque from the second roller shaft 33 of the second drive roller 23A is transferred to the third roller shaft 134 of the third drive roller 124A by a drive belt (not shown in the figure), for example. As a result, the first drive roller 22A, second drive roller 23A, and third drive roller 124A shown in FIG. 3 rotate in the same direction and can convey the recording medium S in the printer assembly 11. More specifically, when the media transportation motor 26 rotates forward, the first drive roller 22A, second drive roller 23A, and third drive roller 124A shown in FIG. 3 convey the recording medium S in the sub-scanning direction inside the printer assembly 11 as denoted by arrow A in the figure, and convey the recording medium S in the direction in which it is discharged from the printer assembly 11 as indicated by arrow B in the figure when the media transportation motor 26 turns in reverse.

The alignment mechanism 28 aligns the recording medium S before the recording head 18 prints on the recording medium S and before the optical reader 110 scans the recording medium S. The alignment mechanism 28 includes plural alignment plates 38 and an alignment plate motor (see FIG. 4) that drives the alignment plates 38. The alignment plates 38 are arrayed in the main scanning direction between the first drive roller 22A and first follower roller 22B and the recording head 18 and platen 21, and can protrude into the transportation path P. The alignment mechanism 28 aligns the orientation of the recording medium S by causing the leading end of the recording medium S to contact the alignment plates 38.

As shown in FIG. 2, the printer assembly 11 has a plurality of alignment sensors 39 that detect the presence of the recording medium S driven in contact with the alignment plates 38. The alignment sensors 39 are disposed to the transportation path P arrayed in the main scanning direction near the upstream side of the alignment plates 38, and are transmissive sensors including a light-emitting unit (such as an LED) and a photodetection unit (such as a phototransistor) disposed with the transportation path P therebetween. Whether the skew of the recording medium S to the transportation direction after alignment by the alignment mechanism 28 is within the allowable range can be determined from the number and positions of the plural alignment sensors 39 that detect the leading end of the recording medium S.

The dot impact printer 10 has a control circuit board (not shown in the figure) located behind and below the print assembly 11, for example, as a control unit that controls dot impact printer 10 operations, including driving the media transportation motor 26, carriage 19 scanning, the recording operation of the recording wires of the recording head 18, and the reading (scanning) operation of the optical reader 110.

The printer assembly 11 also has a plurality of media edge sensors 47 that detect insertion of a recording medium S to the transportation path P in front of the first drive roller 22A. The media edge sensors 47 are reflective sensors having a light-emitting unit that emits light toward the transportation path P and a photodetection unit that detects the reflection of the emitted light, and detect the recording medium S inserted from the manual insertion opening 15. Note that the media edge sensors 47 may alternatively be transmissive sensors having a light-emitting unit and a photodetection unit disposed with the transportation path P therebetween. This configuration determines that a recording medium S was inserted to the transportation path P when the photodetection units of all insertion detection sensors 47 sense light and then photodetection by any one of the insertion detection sensors 47 is blocked.

As shown in FIG. 3, the print assembly 11 has an optical reader 110 (optical reading unit) that reads text, symbols and images presented on the surface of the recording medium S. The optical reader 110 includes a first scanner 111 (first reading unit) that reads information printed or otherwise presented on the top surface of the recording medium S, and a second scanner 112 (second reading unit) disposed opposite the first scanner 111 that similarly reads information printed or otherwise presented on the bottom surface of the recording medium S. The recording medium S is normally inserted from the manual insertion opening 15 so that the side on which the MICR information is printed is on the bottom.

The first scanner 111 and second scanner 112 are optical image sensors that are disposed between the second drive roller 23A and third drive roller 124A and continuously read information on the recording medium S conveyed through the transportation path P.

The first scanner 111 and second scanner 112 may be contact image sensors (CIS), for example, and respectively have a flat glass plate 140, 150 that contacts the recording medium S, and a support frame 141, 151 that supports the glass plate 140, 150. An emitter (not shown in the figure) that emits light output from an LED or other light source to the scanning area of the recording medium S, linear image sensors 111A and 112A that extend in the main scanning direction (X axis) as described below (see FIG. 6), and an output unit (not shown in the figure) that outputs the signals from the linear image sensors 111A and 112A to the control circuit unit described above, are housed inside the support frames 141, 151. The first scanner 111 and second scanner 112 are not limited to CIS scanners, however, and CCD (charge coupled device) scanners may be used instead.

As shown in FIG. 2, the second scanner 112 has a support frame 151 and glass plate 150 extending lengthwise across the width of the dot impact printer 10 parallel to the platen 21. The support frame 151 is disposed so that the top surface of the glass plate 150 is exposed to the transportation path P through a window formed in the rear media guide 25. The first scanner 111 is disposed above the second scanner 112 as shown in FIG. 3 so that the bottom surface of the glass plate 140 is opposite the top of glass plate 150, and likewise extends in the main scanning direction with substantially the same length as the second scanner 112.

An urging member 113 is disposed above the first scanner 111, and the first scanner 111 is urged toward the recording medium S on the rear media guide 25 by the urging member 113. The urging member 113 pushes the first scanner 111 to the second scanner 112 with substantially uniform pressure across the width. A coil spring, flat spring, or elastomer cushion, for example, can be used as the urging member 113. A gap that accommodates recording media of a specific thickness is rendered between the surfaces of the glass plates 140, 150. When scanning a recording medium S, the first scanner 111 is pushed up by the conveyed recording medium S and the urging member 113 contracts, allowing the recording medium S to pass between the glass plates 140, 150. More specifically, the scanning quality of the optical reader 110 is improved by the first scanner 111 that is urged by the urging member 113 pushing the recording medium S to the second scanner 112 side so that the recording medium S reliably contacts the surfaces of the glass plates 140, 150.

The first scanner 111 and second scanner 112 respectively have linear image sensors 111A and 112A (FIG. 6) as described below. The linear image sensors 111A and 112A have the photodetectors arrayed in a line in the main scanning direction of the dot impact printer 10, and the first scanner 111 and second scanner 112 use the linear image sensors 111A and 112A, respectively, to read in lines in the main scanning direction.

The linear image sensors 111A and 112A are longer than the width of the printable area of the recording head 18 in the main scanning direction, and because they cover a wider range than any recording medium that can be printed on by the dot impact printer 10, the optical reader 110 can read the entire surface of any recording medium S that can be used in the dot impact printer 10.

The first scanner 111 and second scanner 112 are disposed on opposite sides of the transportation path P as shown in FIG. 3 with the linear image sensor 111A (FIG. 6) of the first scanner 111 and the linear image sensor 112A (FIG. 6) of the second scanner 112 offset approximately 5 mm from each other in the transportation direction of the recording medium S. This configuration prevents the light from one light source from affecting the photosensors of the other linear image sensor, and therefore enables achieving higher quality scans.

The first scanner 111 and second scanner 112 each have R, G, and B light sources, and can scan in both monochrome (binary, 16 level, 256 level gray scale) and color modes. The scanning resolution of the first scanner 111 and second scanner 112 can be set to one of three levels, 200 dpi (dots/inch), 300 dpi, and 600 dpi. The number of scan lines in the transportation direction of the recording medium S (the subscanning direction) is set according to the scanning resolution in the main scanning direction, and the conveyance speed of the recording medium S during scanning is adjusted according to such parameters as the scanning resolution and how fast the output signals of the linear image sensors 111A and 112A can be processed.

In this embodiment of the invention the linear image sensors 111A and 112A can scan full-color images at a dot resolution of 600 dpi.

Figure 4:
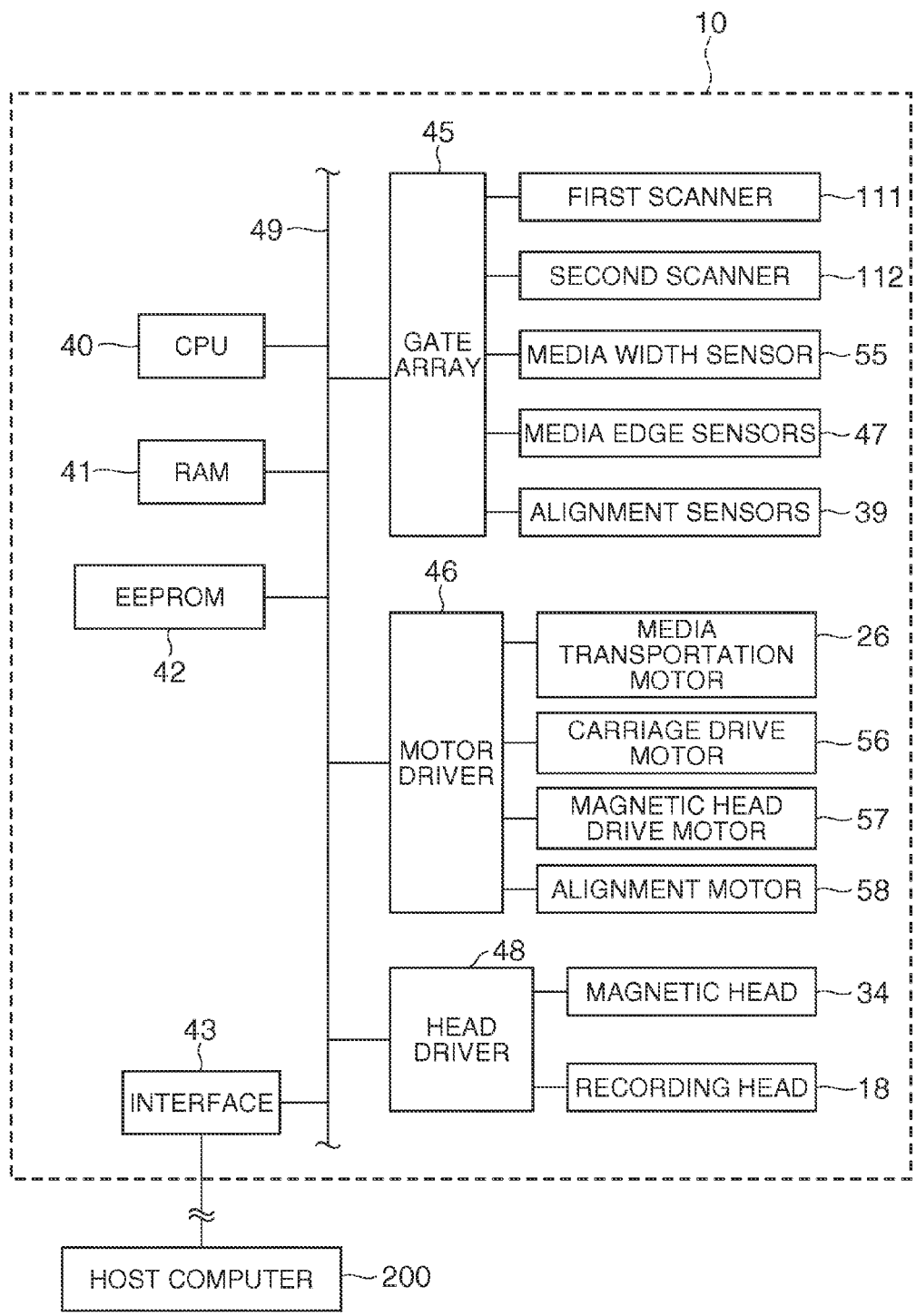
FIG. 4 is a block diagram showing the functional configuration of the dot impact printer.

FIG. 4 is a block diagram showing the control configuration of the dot impact printer 10.

The parts shown in FIG. 4 can be rendered by the cooperation of hardware components disposed to the control circuit board (not shown in the figure) and software.

The dot impact printer 10 includes a CPU 40 as a control unit that controls the dot impact printer 10 based on a control program, RAM 41 that temporarily stores data and a control program read from EEPROM 42 by the CPU 40, EEPROM 42 that stores the control program executed by the CPU 40 and processed data, an interface 43 that converts the data format when communicating information with the host computer 200 that controls the dot impact printer 10, a gate array 45 connected to various sensors, a motor driver 46 that drives motors, a head driver 48 that drives heads, and a bus 49 to which these various parts are connected.

RAM 41 functions as a storage unit, and renders an image buffer (not shown in the figure) that temporarily stores the image data captured by the optical reader 110.

The alignment sensors 39, media edge sensors 47, media width sensor 55, first scanner 111 and second scanner 112 are connected to the gate array 45. The gate array 45 quantizes the analog voltages input from the alignment sensors 39, media edge sensors 47, and media width sensor 55, and outputs the resulting digital data to the CPU 40. The first scanner 111 and second scanner 112 optically read the surface of the recording medium S by means of the linear image sensors 111A and 112A (FIG. 6), and read and supply the detected values (voltages) one at a time from the photodetectors 110A of the linear image sensors 111A and 112A to the gate array 45. The gate array 45 functions as a detection value processing unit, quantizes the analog voltages supplied from the first scanner 111 and second scanner 112, and outputs the resulting pixel-by-pixel digital data in a data train to the CPU 40.

The motor driver 46 is connected to the media transportation motor 26, carriage drive motor 56, magnetic head drive motor 57, and alignment motor 58, supplies drive current and drive pulses to the motors, and thus causes the motors to operate. Note also that an alignment motor 58 (FIG. 4) for operating the alignment plate 38 (FIG. 3) may also be connected to the motor driver 46.

The media edge sensor 47 is connected to the recording head 18 and magnetic head 34, and supplies drive current to the recording head 18 to drive the recording wires to print. The media edge sensor 47 also outputs drive current for reading and writing to the magnetic head 34, and when reading magnetic data detects and outputs the detection voltage (analog voltage) from the magnetic head 34 as digital data to the CPU 40.

Based on a control program stored in EEPROM 42, the CPU 40 acquires detection signals from the sensors, and drives the motors to convey the recording medium S and drives the heads to record on the recording medium S by means of the gate array 45, motor driver 46, and head driver 48.

The CPU 40 also conveys the recording medium S by means of the media transportation mechanism 100, and reads the surface of the recording medium S by means of the gate array 45 and first scanner 111 and second scanner 112. During scanning, the CPU 40 functions an an image generating unit, and based on the data input from the gate array 45 applies an interpolation process as necessary and produces scanned image data for one line of a predetermined number of pixels. This image data is sequentially stored temporarily in an image buffer (not shown in the figure) rendered in RAM 41. The CPU 40 also reads and outputs the image data stored in the image buffer (not shown in the figure) to the host computer 200 (other device) through the interface 43. The CPU 40 that functions as an image generating unit, and the gate array 45 that functions as the detection value processing unit described above, together function as an image processing unit that executes an image process.

Figure 5A:
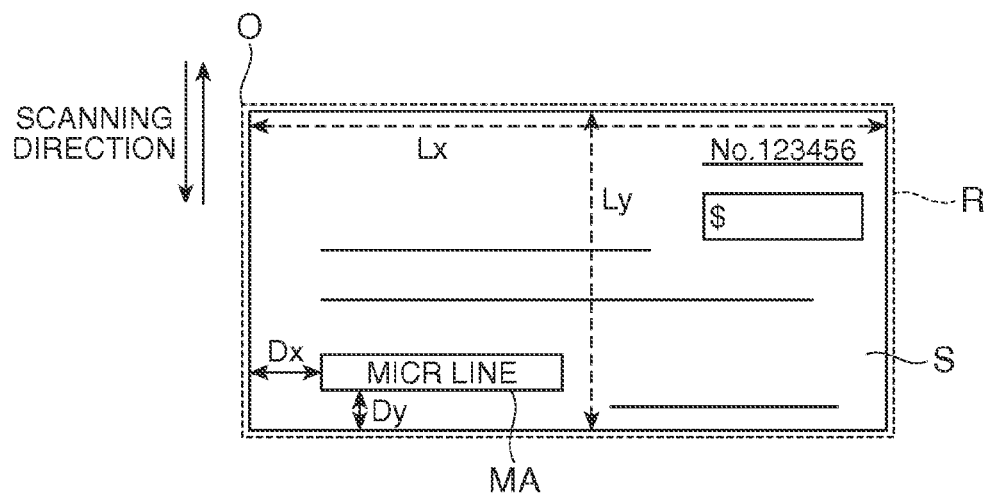
FIG. 5 shows an example of a medium to be scanned.
Figure 5B:
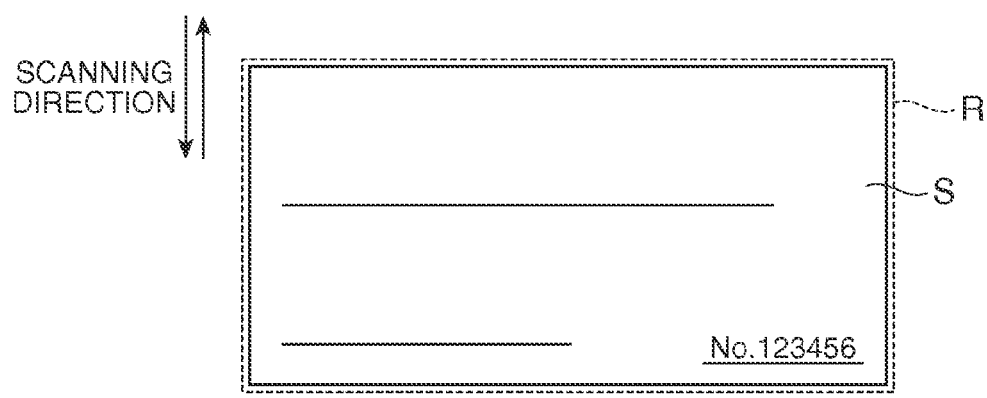

FIG. 5 shows an example of a check as a recording medium S that is processed by the dot impact printer 10. FIG. 5A shows the front and FIG. 5B shows the back of the check.

The check used as the recording medium S is a horizontally long rectangle, is inserted to the dot impact printer 10 with one of the long sides at the leading edge, and is conveyed in the direction of the short side as shown in the figure. Note that the length (width) of the long side of the recording medium S is Lx below, and the length (height) of the short side is Ly.

As shown in FIG. 5A, a check serial number is printed on the front of the recording medium S, which also has fields for writing or printing the date, check amount, payee, name and address of the payer, and a signature line. A MICR area MA where MICR characters are printed is also provided on the bottom left part of the check. As shown in FIG. 5B, fields for writing or printing the account number and the name of the financial institution on which the check is drawn are provided on the back of the recording medium S. The check serial number may also be printed on the back of the recording medium S.

The recording medium S shown in FIG. 5 is inserted from the manual insertion opening 15 to the dot impact printer 10 with the side shown in FIG. 5A facing down and the back shown in FIG. 5B facing up. The front side shown in FIG. 5A is therefore the bottom surface as referred to herein and is read by the second scanner 112, and the back side shown in FIG. 5B is the top surface read by the first scanner 111. The magnetic head 34 also reads the MICR text in the MICR area MA shown in FIG. 5A.

The scanning range R of the first scanner 111 is set according to the size of the recording medium S, and is slightly greater than the width Lx and height Ly of the recording medium S as indicated by the dotted line in FIG. 5B. The width and height of the scanning range R are sized to add a scanning margin to the width Lx and height Ly of the recording medium S, and this scanning margin is typically a few millimeters, for example. The first scanner 111 can therefore optically scan the entire back of the recording medium S.

The scanning range R of the second scanner 112 is similarly set according to the size of the recording medium S, and is slightly greater than the width Lx and height Ly of the recording medium S as indicated by the dotted line in FIG. 5A. In this embodiment of the invention the width and height of the scanning range R are sized to add a scanning margin to the width Lx and height Ly of the recording medium S, and this scanning margin is typically a few millimeters, for example. The first scanner 111 can therefore optically read the entire back of the recording medium S.

The dot impact printer 10 reads the recording medium S by means of the optical reader 110 while conveying the recording medium S forward (normal direction) or reverse in the direction of the short side. The direction in which the recording medium S is conveyed while scanning is automatically determined so that scanning the part to be read can be completed with the shortest possible transportation distance.

Commands are sent from the host computer 200 to the dot impact printer 10 through the interface 43, and the size (Lx, Ly) of the recording medium S to be scanned is set by command. The CPU 40 identifies the size of the recording medium S based on the command received from the host computer 200 and sets the scanning range R accordingly. Information identifying the location of the MICR area MA on the recording medium S is also contained in the command sent from the host computer 200. The location of the MICR area MA may be specified by the distance Dx from a short side of the recording medium S and the distance Dy from a long side, for example. The CPU 40 controls the motor driver 46 and head driver 48 based on the received command, and drives the magnetic head drive motor 57 to read with the magnetic head 34.

The commands sent from the host computer 200 to the dot impact printer 10 include setup commands, a start scanning (reading) command, and a paper discharge command.

The setup commands are commands for specifying the scanning resolution of the optical reader 110, the scanning side (whether to scan the top or bottom), the scanning direction, the scanning mode (color or monochrome scanning), the number of gray levels if monochrome scanning is selected, the LED output color if monochrome scanning is selected, and the scanning area (the start and endpoints of the scanning area) if only part of the scanning range R is to be scanned. Note that the coordinates of the start and end points of the scanning area are coordinates referenced to an origin at the left edge of the leading end of the scanning range R, for example. After receiving the setup command, the CPU 40 extracts the values specified in the setup command as the setting.

The start scanning command is a command that tells the dot impact printer 10 to start the scanning process. The start scanning command includes information specifying the type of scanning operation, that is, a full scan that reads all of the scanning range R, or a partial scan that reads only the scanning area specified by the setup command. When the CPU 40 receives the start scanning command, it controls the gate array 45 and motor driver 46 to start scanning by the optical reader 110.

The discharge command is a command that specifies whether to discharge the recording medium S from the manual insertion opening 15 or paper exit 20 after scanning is completed, and includes a discharge instruction and information specifying the discharge direction (the manual insertion opening 15 or paper exit 20). When the CPU 40 receives the discharge command, it discharges the recording medium S from the side specified by the discharge command.

Figure 6:
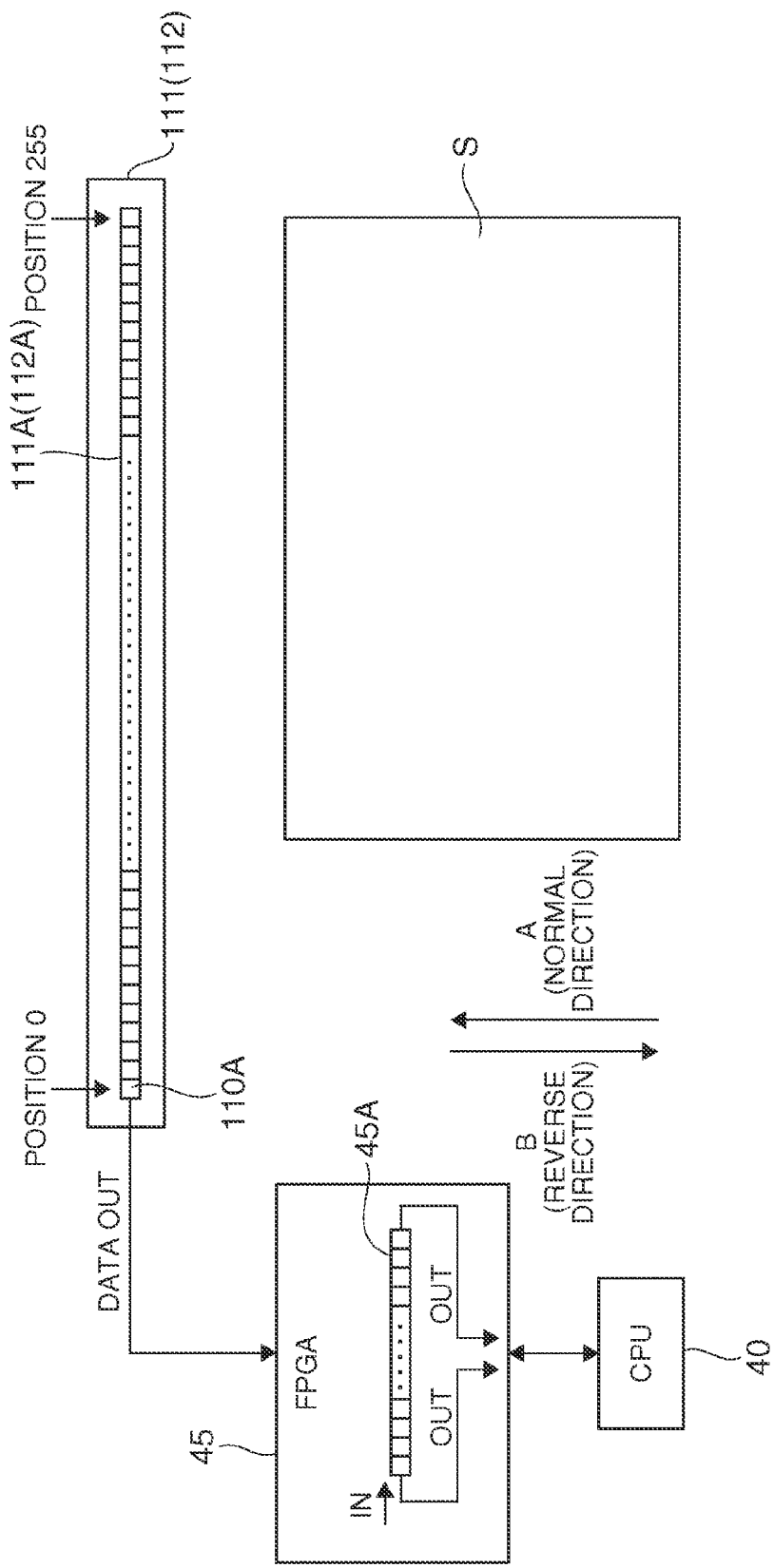
FIG. 6 describes the scanning direction of the linear image sensor.

FIG. 6 describes the scanning direction of the detection values from the linear image sensors 111A and 112A including the first scanner 111 and second scanner 112. Note that the linear image sensor 111A including the first scanner 111, and the linear image sensor 112A including the second scanner 112, are identical, and the configuration of the linear image sensor 111A is therefore shown in FIG. 6.

As shown in FIG. 6, the linear image sensor 111A has a plurality of photodetectors 110A arrayed in a straight line extending perpendicularly to the transportation direction of the recording medium S. The linear image sensor 111A in this embodiment of the invention is a CMOS image sensor, and the photodetectors 110A are the individual CMOS cells. In the example shown in FIG. 6, 256 photodetectors are arrayed in a line. The end of the main scanning direction at column 0 is denoted position 0, and the opposite end is denoted position 255. The number of pixels scanned in the main scanning direction is thus 256.

The first scanner 111 sequentially outputs the detection values (charge) of the numerous photodetectors 110A of the linear image sensor 111A from the photodetector 110A at one end of the array. The detection values of the photodetectors 110A can be output starting from either end of the linear image sensor 111A. In the example shown in FIG. 6, the detected values are output to the gate array 45 from position 0 to position 255 starting from the left side (column 0) when the recording medium S is conveyed in the normal (forward) direction denoted by arrow A. This output sequence is determined from how the first scanner 111 and gate array 45 are wired and the specifications of the first scanner 111.

The detection values (charge) output by the linear image sensor 111A are input to the gate array 45. The gate array 45 in this embodiment of the invention is a FPGA (field programmable gate array), quantizes the charge of each pixel input from the linear image sensor 111A, and generates and stores data for each pixel in an internal data buffer 45A.

The gate array 45 generates data for each pixel from the values detected by each photodetector that are input from the first scanner 111, and stores the resulting pixel data in the order generated in the data buffer 45A. The gate array 45 then outputs the data stored in the data buffer 45A either in the order in which it was stored or the reverse order. The CPU 40 controls whether the gate array 45 outputs the data from the data buffer 45A in forward or reverse order. More specifically, the gate array 45 can switch operation as controlled by the CPU 40 and arrange and output the pixel data in the same direction as the order of the photodetectors in the linear image sensor 111A, or arrange and output the pixel data in the reverse order.

The scanning operations of the dot impact printer 10 when conveying the recording medium S forward and when conveying the recording medium S in reverse are described next.

Figure 7A:
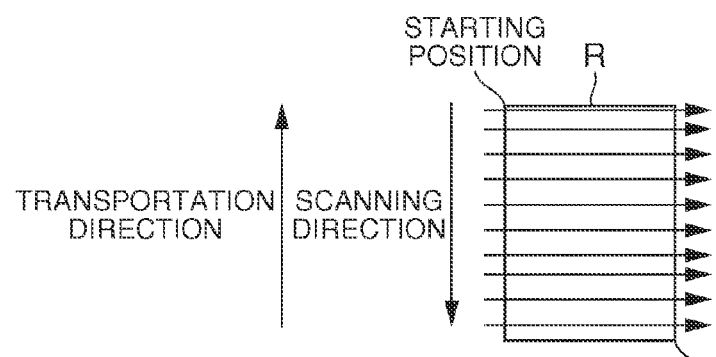
FIG. 7 describes the scanning operation using an optical scanner.
Figure 7B:
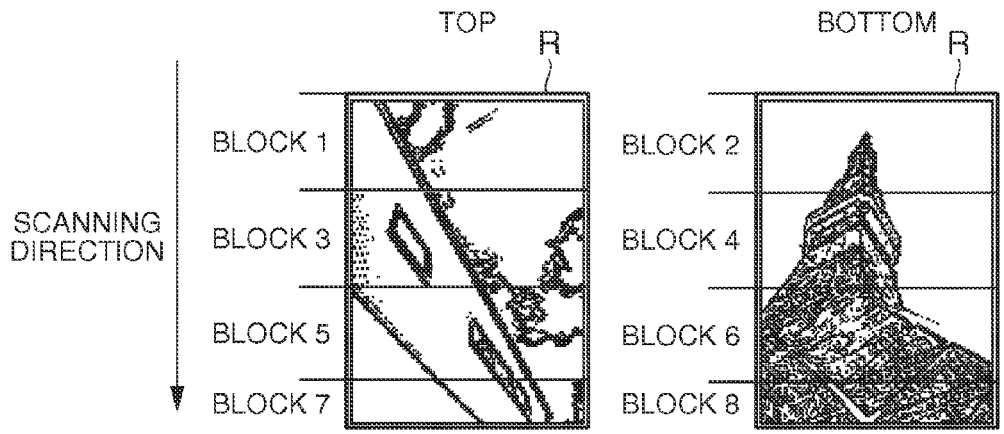
Figure 7C:
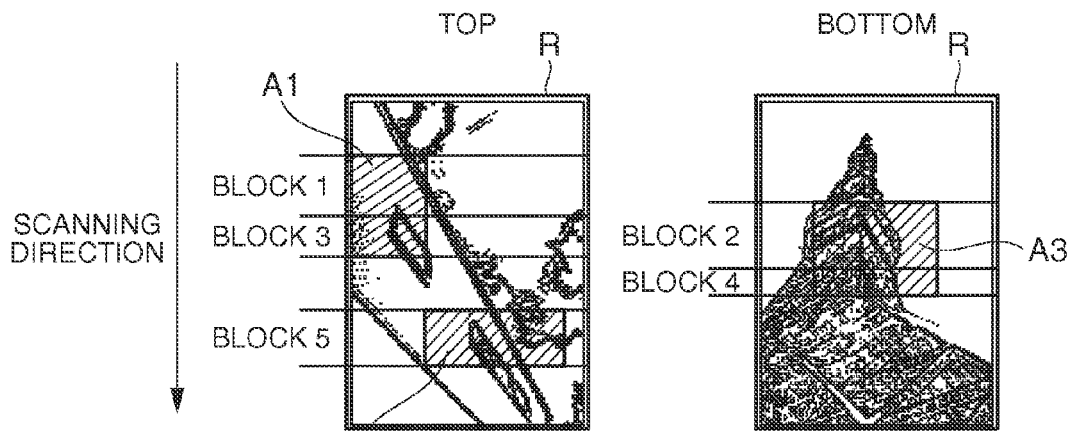

FIG. 7 illustrates the forward scanning operation of the dot impact printer 10. FIG. 7A shows the scanning direction, FIG. 7B schematically describes scanning by the dot impact printer 10 in the full scan mode, and FIG. 7C schematically describes operation in the partial scan mode.

When the dot impact printer 10 scans in the normal (forward) direction (arrow A in FIG. 3), the recording medium S passes the optical reader 110 and is scanned by the first scanner 111 and second scanner 112 while traveling from the front (the left in FIG. 3) of the dot impact printer 10 to the rear (the right in FIG. 3).

In this case, as shown in FIG. 7A, the recording medium S is scanned from the leading end of the scanning range R (the top in the figure) to the trailing end (the bottom in the figure). The image data of the one line scanned by the first scanner 111 and second scanner 112 is output to the gate array 45 line by line sequentially from the left end of the scanning range R (the beginning of the arrow) to the right end (the tip of the arrow). The left end of the leading edge of the scanning range R is therefore the scanning start position, and the right end of the trailing edge is the end position.

When a full scan is indicated by the command sent from the host computer 200, the CPU 40 divides the scanning range R into segments of a predetermined length in the scanning direction (subscanning direction) as shown in FIG. 7B. These segments are referred to as blocks. The scanning range R of the first scanner 111 and the scanning range R of the second scanner 112 are each segmented into plural blocks of a specified length, and the blocks are sequentially numbered alternately top and bottom from the leading end of the scanning direction. More specifically, the first block of the scanning range R on the top surface is block 1, the first block of the scanning range R on the bottom surface is block 2, and the remaining blocks are similarly numbered alternating top and bottom in the scanning direction 3, 4, . . . 8 as shown in the figure. The length of the last block is the length of the block remaining after dividing the scanning range R into blocks of the specified length.

Each block is the size of the process unit in which the image data from the first scanner 111 and second scanner 112 is sent to the host computer 200. That is, each time the image data for one block is stored in the image buffer (not shown in the figure) in RAM 41, the CPU 40 sends the image data for that block to the host computer 200. The specified length, that is, the length of each block in the transportation direction (scanning direction) is determined according to the capacity of the image buffer (not shown in the figure) reserved in RAM 41. For example, if the image buffer has sufficient capacity to store 300 lines of full-color image data at the maximum resolution of 600 dpi, the length of one block is set appropriately to a length of 300 lines or less.

When scanning in the full scan mode, the CPU 40 controls the motor driver 46 to drive the media transportation motor 26 to convey the recording medium S at a specified speed while controlling the gate array 45 and driving the light sources of the first scanner 111 and second scanner 112 to generate the scanned image data based on the detection values from the linear image sensors 111A and 112A and storing the scanned image data line by line to the image buffer in RAM 41.

The CPU 40 continues this operation without interrupting conveying the recording medium S until the entire scanning range R is read by the first scanner 111 and second scanner 112. When scanning any block is completed (ends) during this operation and the image data for one block is stored in the image buffer of the RAM 41, the CPU 40 reads and sends the image data for that block from the image buffer to the host computer 200, and then deletes the scanned image data from the image buffer after transmission is completed. Deleting the scanned image data creates a large empty space in the image buffer again so that the image data captured next can be stored.

Each time scanning one block is completed, the CPU 40 sends the captured image data to the host computer 200 as described above. Note that the order in which the image data captured from each block is sent is the order in which scanning is completed, and is not limited to the order of the block numbers.

When the command received from the host computer 200 specifies a partial scan, the CPU 40 sets the area to be scanned according to the scanning area specified in the scanning range R by the setup command as shown in FIG. 7C. In the example shown in FIG. 7C, areas A1 and A2 are set in the scanning range R of the top, and area A3 is set in the scanning range R of the bottom side of the recording medium S.

The CPU 40 configures the scan blocks according to the partial scan areas. If the length of an area in the scanning direction is shorter than the predetermined length of one block described above, the CPU 40 produces one block for the one area. The leading end and the trailing end of this block match the leading end and trailing end of the area. If the length of the area is greater than the predetermined block length, the CPU 40 segments the scanning area into blocks of the specified length starting from the leading end of the area in the scanning direction. In the example shown in FIG. 7C, areas A1 and A3 exceed the predetermined block length, area A1 is therefore divided into blocks 1 and 3, and area A3 is divided into blocks 2 and 4. The block numbers are assigned sequentially from the leading end of the first block alternating top and bottom in the same way as in the full scan mode.

Note that when there are plural scan areas defined across the width of the scanning range R, and the areas overlap in the scanning direction, all of the overlapping areas are treated as a single block. If the length of such a block in the scanning direction exceeds the maximum length of one block, the block is segmented into plural blocks in the scanning direction.

The CPU 40 then starts scanning areas A1 to A3 in the scanning range R. The CPU 40 controls the gate array 45 and motor driver 46 and continues the scanning operation without interrupting transportation of the recording medium S until all areas have been scanned by the first scanner 111 and second scanner 112. When reading any block on the top or bottom is completed and the image data for that block is stored in the image buffer in RAM 41 during this operation, the CPU 40 reads and sends the image data for that block from the image buffer to the host computer 200, and then deletes the image data from the image buffer after data transmission is completed. The transmission sequence in this case is the same as during the full scan mode, that is, in the order in which block scanning is completed and is not limited to the order of the block numbers.

The host computer 200 receives the scanned image data sent from the dot impact printer 10, and reconstructs the scanned image block by block based on the header information. In addition, when the host computer 200 specifies the full scan mode in the setup command sent to the dot impact printer 10, it reproduces images for the entire scanning range R of both the top and bottom sides by rejoining the blocks. In addition, when the partial scan mode is specified by the setup command, the host computer 200 reproduces the scanned image data for each area by rejoining the blocks when a single area is divided into plural blocks, and using the scanned image data contained in each block as is when a single block constitutes a single area.

Figure 8A:
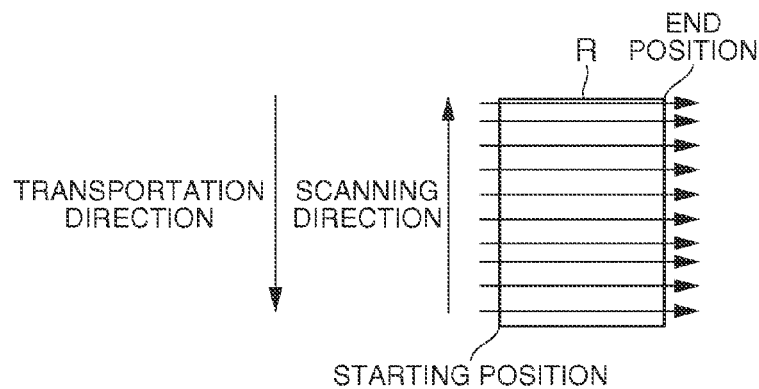
FIG. 8 describes the scanning operation using an optical scanner.
Figure 8B:
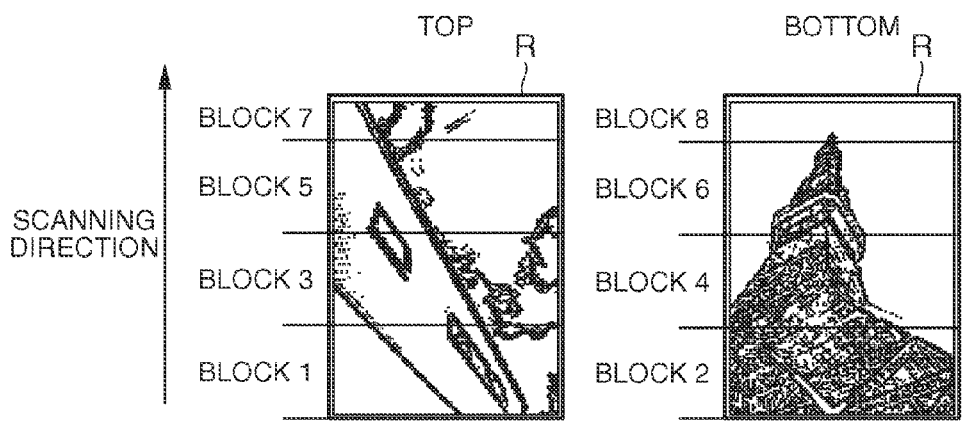
Figure 8C:
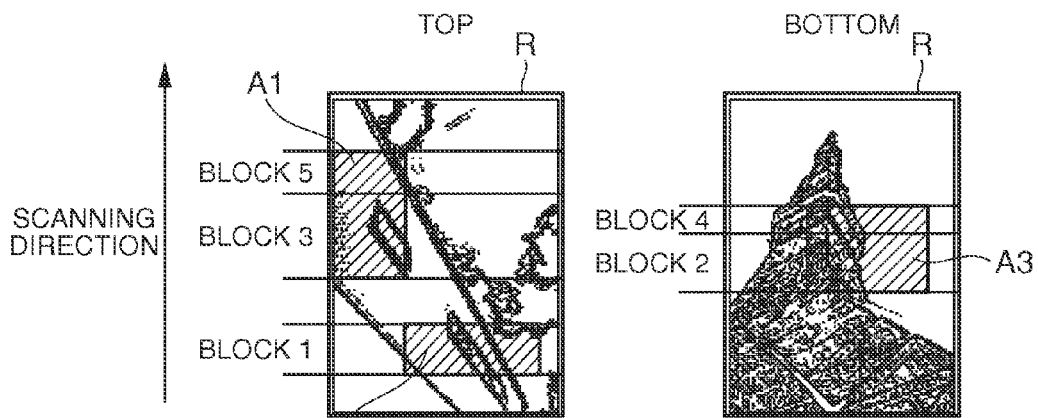

FIG. 8 illustrates the reverse scanning operation of the dot impact printer 10. FIG. 8A shows the scanning direction, FIG. 8B schematically describes scanning in the full scan mode, and FIG. 8C schematically describes operation in the partial scan mode.

When the dot impact printer 10 scans in the reverse direction, the recording medium S passes the optical reader 110 and is scanned by the first scanner 111 and second scanner 112 while traveling from the rear of the dot impact printer 10 to the front. In this case scanning proceeds from the trailing end of the scanning range R as shown in FIG. 8A (the bottom end in the figure) to the leading end (the top end in the figure). Because the scanned image of one line captured by the first scanner 111 and second scanner 112 is output sequentially from the left end of the scanning range R through the gate array 45, the left end of trailing edge of the scanning range R is the scanning start position and the right edge of the leading end is the end position.

When scanning in reverse in the full scan mode, the scanning range R is segmented into blocks from the trailing end as shown in FIG. 8B. The block numbers are assigned sequentially from the end at the leading edge during scanning while alternating front and back. Other aspects of the operation are the same as during a full scan in the forward direction.

When scanning in reverse in the partial scan mode, the areas to be scanned are configured based on the setup command received from the host computer 200 as shown in FIG. 8C, and the areas are segmented into blocks from the trailing end of the scanning range R, which is the leading end in the scanning direction. Areas that exceed the maximum length of one block are divided into blocks of the specified length referenced to the trailing end of the scanning range R. Other aspects of the operation are the same as during a partial scan in the forward direction.

The top and bottom of the scanned image data captured in the reverse direction is inverted from the image data captured when scanning forward. As a result, the CPU 40 of the dot impact printer 10 may execute a process to invert the image data before transmission to the paper exit 20. Alternatively, because the host computer 200 that sent the setup command has information about the scanning direction, the host computer 200 can use this information to rotate the scanned image data 180 degrees.

FIG. 9 schematically describes the data structure of the scanned image data sent by the dot impact printer 10 to the host computer 200.

The CPU 40 of the dot impact printer 10 packetizes the scanned image data captured by the first scanner 111 and second scanner 112 as shown in FIG. 9B, and transmits the packets with the header shown in FIG. 9A and the footer shown in FIG. 9C.

The packets shown in FIG. 9B start with a SOH code and end with a NUL code, and have a header preceding the actual scanned image data.

The header contains the area number on the recording medium S of the scanned image data carried in the packet, information denoting the top or bottom of the recording medium S, information denoting whether the conveyance direction of the recording medium S during scanning was forward or reverse, and information denoting the data sequence. This data sequence is information identifying the end of the linear image sensor 111A and 112A from which the data on a particular line of the scanned image data was captured.

For example, if the right end of each line of the scanned image data corresponds to the left end of the linear image sensor 111A (column position 0 in the main scanning direction), this data sequence value indicates that the data sequence is "normal." In this case the scanned image data is an image of the top of the recording medium S captured in the normal orientation. However, if the left end of each line in the scanned image data corresponds to the left end of the linear image sensor 111A (column 0), the data sequence indicates a "mirror" image. In this case the scanned image data is an image of the top of the recording medium S captured in the normal orientation with the left and right sides inverted.

The host computer 200 receiving the packets shown in FIG. 9B can therefore obtain normal and mirror images of the recording medium S by processing the scanned image data in the packets based on the data sequence. That is, when the data sequence indicates a normal image, the host computer 200 assembles the scanned image data in the packets as received to acquire an image (normal) of the top of the recording medium S, and can obtain a mirror image by inverting the image left to right. If the data sequence indicates a mirror image, the host computer 200 can obtain a normal image by inverting the scanned image data in the packets left to right.

The CPU 40 transmits a header containing an identification code indicating the type of data to be sent (see FIG. 9A) before the packet shown in FIG. 9B. After transmitting the packets shown in FIG. 9B containing the scanned image data, the CPU 40 sends a footer (FIG. 9C) containing information denoting the scanning result.

Note that other information may obviously also be contained in the header of the block shown in FIG. 9B.

For example, if the scanned image data is large, the CPU 40 could segment the scanned image data to generate and send plural blocks as shown in FIG. 9B. In this case information enabling the host computer 200 to reassemble the segmented scanned image data may be contained in the header.

Information about the size, block number, and data length, for example, of the scanned blocks may also be included in the header of the block shown in FIG. 9B when the scanning range of the recording medium S is divided into plural blocks as shown in FIG. 7 and FIG. 8.

In addition, when selected areas are scanned as shown in FIG. 7C and FIG. 8C, information indicating the area number of the scanned image data, and the coordinates of the start and end positions of the area, may also be contained in the header. If a single area is divided into plural blocks, information for rejoining the blocks constituting each area may also be included. In addition, when plural areas are contained in one block, the scanned image data of the block may be divided into the individual areas and the data may be sent by area to the host computer 200.

In addition to when sending the scanned image data to the host computer 200, the dot impact printer 10 also sends the data sequence information in response to a request sent from the host computer 200.

More specifically, the CPU 40 functions as a response control unit, and when a status request sent from the host computer 200 is received, the CPU 40 returns a status report (FIG. 9D) indicating the operating status of the dot impact printer 10 in response to the request. In the status report shown in FIG. 9D, the data sequence is included with the scanning side information. As a result, information indicating whether the image data captured from the top of the recording medium S is a normal image or mirror image, or information denoting the scanning direction of the linear image sensors 111A and 112A, can be sent to the host computer 200 with information indicating whether the image data captured from the bottom of the recording medium S is a normal image or mirror image. As a result, the image data captured from the top of the recording medium S, and the image data captured from the bottom, can be normal or mirror images independently of the other.

Figure 10:
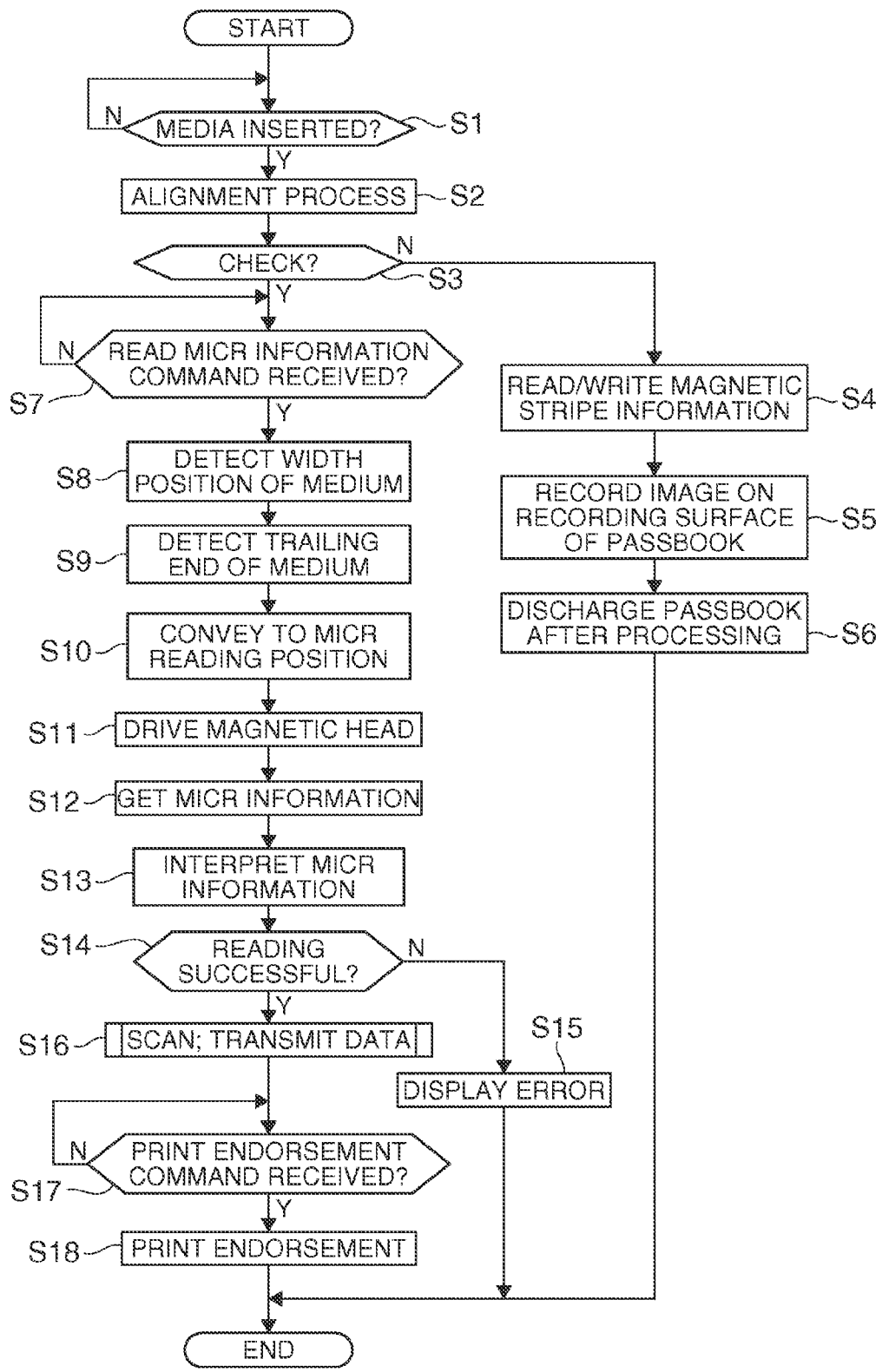
FIG. 10 is a flow chart of the operation of the dot impact printer.

FIG. 10 is a flow chart describing the operation of the dot impact printer 10 according to this embodiment of the invention.

When a recording medium S is inserted to the manual insertion opening 15 and the media edge sensors 47 detect the leading end of the recording medium S (step S1 returns Yes), the CPU 40 of the dot impact printer 10 drives the alignment plate 38 to protrude into the transportation path P of the recording medium S and operates the media transportation motor 26 to align the recording medium S (step S2).

The CPU 40 the determines whether the detected recording medium S is a check or a passbook (step S3).

The CPU 40 can determine the type of recording medium S based on information acquired from the host computer 200. Alternatively, the CPU 40 can detect the locations of the leading end and side of the recording medium S using the media edge sensors 47 and media width sensor 55, and determine the type of recording medium S based on this position and size information. Further alternatively, based on the positions of the leading end and side of the recording medium S detected using the media edge sensors 47 and media width sensor 55, the CPU 40 may attempt to read the MICR information using the magnetic head 34, and determine the type of recording medium S by determining whether or not MICR information is found in the MICR area MA by this reading attempt. In this embodiment of the invention the CPU 40 acquires from the host computer 200 information identifying the type of recording medium S (check or passbook), information such as the size of the check if the recording medium S is a check, information about the location of the MICR area MA, and information about the transportation distance, and determines based on the received information whether the recording medium S is a check or a passbook.

If the recording medium S is not a check (step S3 returns No) and the CPU 40 determines that the recording medium S is a passbook, for example, it conveys the recording medium S to the position where the magnetic stripe on the passbook can be read by the magnetic head 34, and then reads and/or writes the magnetic stripe by means of the magnetic head 34 (step S4).

The CPU 40 then conveys the recording medium S to the position of the recording head 18, records on the recording surface by means of the recording head 18 (step S5), and then discharges the recording medium S from the manual insertion opening 15 (step S6) to complete the process.

If the recording medium S is a check (step S3 returns Yes), the CPU 40 determines if a MICR information read command was received from the host computer 200 (step S7). If the CPU 40 determines that a MICR read command was received (step S7 returns Yes), it retracts the alignment plate 38 from the transportation path P, and conveys the recording medium S by means of the media transportation mechanism 100 until at least the leading end of the recording medium S is directly below the media width sensor 55. The CPU 40 then drives the carriage drive motor 56 (FIG. 4) to move the carriage 19 in the main scanning direction, and detects the widthwise position of the recording medium S based on the output signals from the media width sensor 55 and the position of the carriage 19 in the main scanning direction (step S8). The CPU 40 then monitors the output signals from the media edge sensors 47 while conveying the recording medium S by means of the media transportation mechanism 100, and detects the trailing end of the recording medium S (step S9).

The CPU 40 then conveys the recording medium S by means of the media transportation mechanism 100 to the position where the MICR area MA can be read by the magnetic head 34 (step S10). The CPU 40 then controls the motor driver 46 to operate the magnetic head drive motor 57 (FIG. 4), and reads the MICR text in the MICR area MA by means of the magnetic head 34 (step S11).

The MICR information read by the magnetic head 34 is then digitized by the gate array 45. The CPU 40 then acquires the output digital data (step S12), extracts the character data from the digital data and converts it to text information (step S13). Whether the number of uninterpretable characters in the extracted text exceeds a predetermined number, or whether the character count is within the range of the predetermined count and reading the MICR information was successful, is then determined (step S14).

If the number of characters exceeds the predetermined count and there is an unreadable character (step S14 returns No), the CPU 40 outputs an error and discharges the recording medium S (step S15), and ends operation. The error can be reported in step S15 using a display unit disposed to the dot impact printer 10, sending information indicating that an error occurred to the host computer 200, or using both methods.

If the number of uninterpretable characters does not exceed the preset count and reading was successful (step S14 returns Yes), the CPU 40 scans the recording medium S using the optical reader 110 and sends the captured image data to the host computer 200 (step S16), and then waits to receive a command to print an endorsement on the back from the host computer 200 (step S17). When an endorsement print command is received (step S17 returns Yes), the CPU 40 reverses the media transportation motor 26 to convey the recording medium S to below the recording head 18, and then drives the carriage drive motor 56 and recording head 18 to print an endorsement indicating that the check was processed on the back of the recording medium S (step S18). When printing the endorsement is completed, the CPU 40 drives the media transportation motor 26 again to discharge the recording medium S from the manual insertion opening 15 or the paper exit 20.

Figure 11:
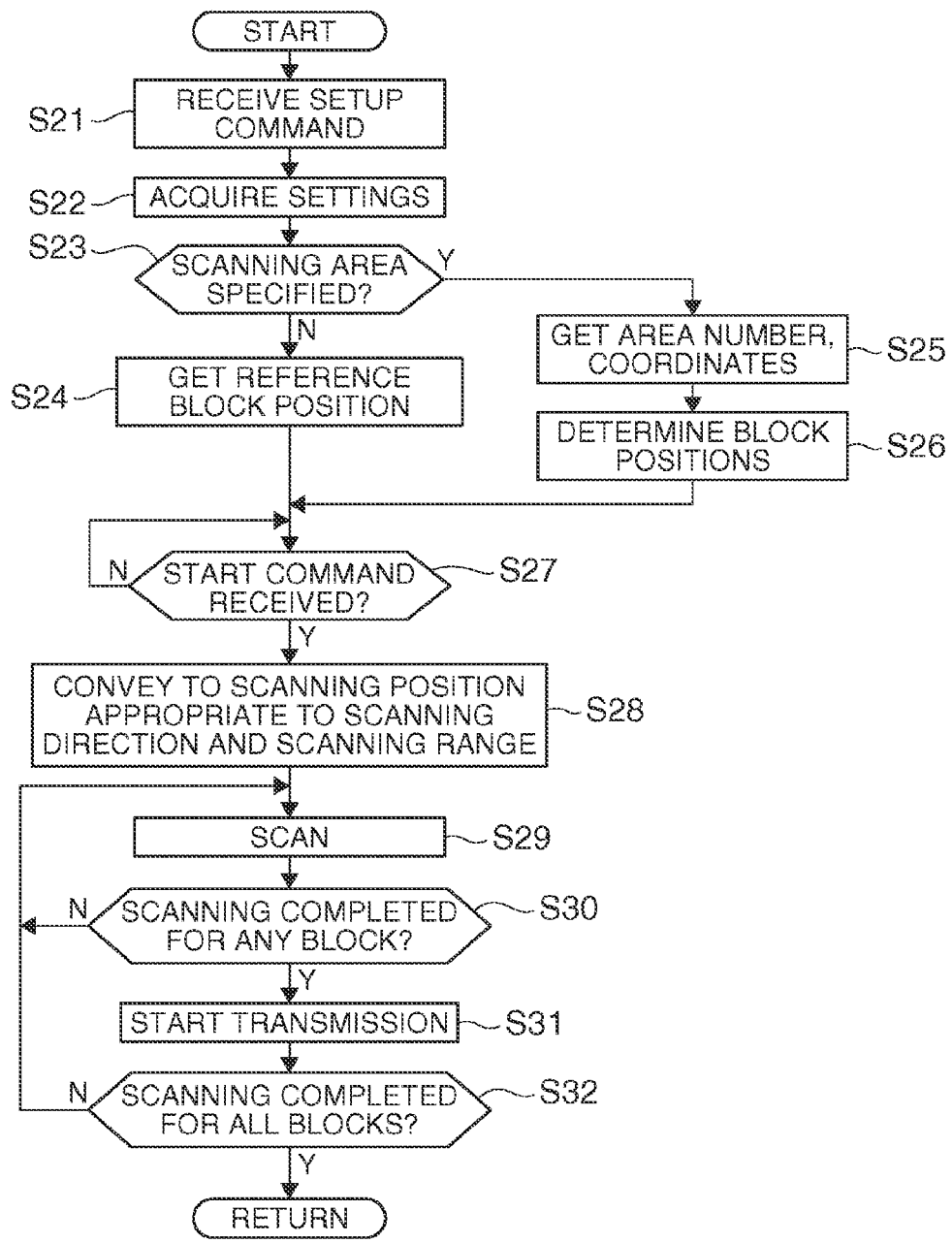
FIG. 11 is a flow chart of the operation of the dot impact printer.

FIG. 11 is a flow chart of the scanning operation executed by the dot impact printer 10, and describes the operation executed in step S16 in FIG. 10 in further detail.

The CPU 40 receives the setup command sent from the host computer 200 (step S21), and acquires the settings content specified by the setup command (step S22). The CPU 40 determines if the area to be scanned is specified in the setup command (step S23). If the scanning area is not specified (step S23 returns No), the CPU 40 acquires the position of the block referenced to scan the entire scanning range R based on the scanning direction specified in the setup command (step S24). The position of the reference block used for a full scan of the scanning range R is stored in EEPROM 42, for example.

If a specific scanning area is specified in the setup command (step S23 returns Yes), the CPU 40 acquires the area numbers and the coordinates of the start and end positions of each area (step S24), positions the areas in the scanning range R, and determines the positions of the blocks for each area based on the scanning direction specified in the setup command (step S26).

After the block positions are acquired or determined, the CPU 40 waits to receive a start scanning command from the host computer 200 (step S27). When a start scanning command is received (step S27 returns Yes), the CPU 40 conveys the recording medium S to the scanning start position of the optical reader 110 by means of the media transportation mechanism 100 based on the scanning direction specified in the setup command, whether a full scan or partial scan is specified, the position of the specified area if a partial scan is specified, and the current position of the recording medium S (step S28), and scans while by means of the first scanner 111 and second scanner 112 conveying the recording medium S (step S29).

While scanning continues the CPU 40 determines if there is a block for which scanning is completed (step S30). If there is a block for which scanning is completed (step S30 returns Yes), the CPU 40 starts the process of reading and sending the image data captured for that block from the image buffer in RAM 41 to the host computer 200 (step S31), and then deletes the image data for that block from the image buffer after data transmission is completed.

The CPU 40 then determines if scanning all blocks was completed (step S32). If there is a block for which scanning is not completed (step S32 returns No), the CPU 40 returns to step S29, continues scanning, and if there is a new block for which scanning is completed, sends the image data for that block to the host computer 200.

If scanning all blocks in the scanning range R on both front and back sides is completed (step S32 returns Yes), the scanning operation ends.

As described above the linear image sensor 111A of the first scanner 111 and the linear image sensor 112A of the second scanner 112 are offset with the linear image sensor 111A positioned approximately 5 mm in front in this embodiment of the invention. As a result, scanning the scanning range R on the top side is completed before scanning the scanning range R on the bottom is completed when scanning in the forward direction, and when scanning in reverse scanning the scanning range R on the bottom is completed before scanning the scanning range R on the top is completed.

As described above, the dot impact printer 10 according to this embodiment of the invention has a media transportation mechanism 100 that conveys a recording medium S to be scanned, and an optical reader 110. The optical reader 110 has linear image sensors 111A and 112A disposed with photodetectors arrayed in a line perpendicular to the transportation direction of the recording medium S, optically reads the surfaces of the recording medium S conveyed by the media transportation mechanism 100 by means of the linear image sensors 111A and 112A, and sequentially outputs the detection values of the photodetectors of the linear image sensors 111A and 112A from either end of the linear array. The dot impact printer 10 generates scanned image data based on the detector values read by the optical reader 110, adds to the scanned image data information indicating the sequence in which the photodetectors of the linear image sensors 111A and 112A were read and the order of the pixels in the scanned image data, and outputs the result to the host computer 200. As a result, the host computer 200 connected to the dot impact printer 10 can accurately determine, based on the information added to the scanned image data, the order of the pixels in the scanned image data (the read order) and whether the photodetectors of the linear image sensors 111A and 112A were read forward or reverse, that is, whether the received scanned image data is a normal image or a mirror image. The linear array of photodetectors in the linear image sensors 111A and 112A can therefore be read from one end or from the other end of the array. As a result, the scanned image data can be processed in the correct direction even without using a program written specifically for the specifications of the linear image sensors 111A and 112A, and unintentional image inversion, for example, can be prevented. The invention can also be used to read the top, the bottom, or both the top and bottom of the recording medium S.

Based on the detection values from the photodetectors output by the optical reader 110, the gate array 45 generates and stores pixel data in the data buffer 45A, and outputs the pixel data stored in the data buffer 45A in the same sequence as the photodetector detection values of the linear image sensors 111A and 112A were read, or in the reverse sequence. Based on the pixel data output by the gate array 45, the CPU 40 then generates the scanned image data. As a result, scanned image data with the pixel data arranged in the same order or the reverse order as the order in which the photodetector detection values were read by the optical reader 110 can be generated according to the setting of the gate array 45. Normal and mirror images of the scanned image data can therefore be freely generated and output without being limited by the scanning direction specifications of the linear image sensors 111A and 112A.

The optical reader 110 has a first scanner 111 that reads a first side of the recording medium S and a second scanner 112 that reads the other side of the recording medium S disposed on opposite sides of the transportation path, and linear image sensors 111A and 112A disposed in the first and second scanners 111 and 112, respectively. The optical reader 110 adds information describing the relationship between the sequence of the pixels in the scanned image data and the reading sequence of the photodetectors of the linear image sensor 111A in the first scanner 111 to the scanned image data output from the first scanner 111, adds information describing the relationship between the sequence of the pixels in the scanned image data and the reading sequence of the photodetectors of the linear image sensor 112A in the second scanner 112 to the scanned image data output from the second scanner 112, and outputs to the host computer 200.

As a result, the pixel sequence can be separately set for the image data scanned from the top of the recording medium S and the image data scanned from the bottom of the recording medium S, and can be sent with additional information describing whether the scanned image is a normal image or a mirror image to the host computer 200. This enables suitably acquiring scanned image data of both top and bottom sides according to the application and processing of the scanned image data, including, for example, acquiring an inverted image of only one side for security.

In addition, when the dot impact printer 10 reads the blocks set in the scanning range R of the optical reader 110 by means of the optical reader 110 and finishes scanning at least one block, the dot impact printer 10 reads and sends the scanned image data of the completely scanned block from the image buffer in RAM 41 even if reading the other blocks is not finished. Data output therefore does not wait until scanning all blocks is completed, and the wait time associated with transmitting the scanned image data can be shortened. As a result, the overall scanning process can be completed more quickly and convenience can be improved. In addition, the size of the image buffer in RAM 41 only needs to be sufficient to store one block of scanned image data, and less storage capacity is therefore required than when the scanned image data for the entire scanning range R is stored.

Furthermore, because the dot impact printer 10 sends a status report including information indicating the scanning direction of the linear image sensors 111A and 112A to the host computer 200 in response to a status request from the host computer 200, the host computer 200 can easily acquire the data sequence of the first scanner 111 and second scanner 112, can process the scanned image data appropriately to the scanning direction, and can prevent unintentional image inversion.

A preferred embodiment of the invention is described above, but the invention is not limited thereto. For example, a configuration in which the alignment mechanism 28, recording head 18, and optical reader 110 are disposed in this order to the transportation path P of the recording medium S is described in the foregoing embodiment, but the invention is not so limited and the locations of these devices can be changed as desired. For example, the optical reader 110 could be disposed closest to the manual insertion opening 15.

In addition, the foregoing embodiment describes a control unit that is disposed to a control circuit board (not shown in the figure) installed in the dot impact printer 10, has the functions shown in the function blocks in FIG. 4, and controls other parts of the dot impact printer 10, but a device externally connected to the dot impact printer 10 could function as the function units shown in FIG. 4 and control operation of the dot impact printer 10. In addition, the function blocks shown in FIG. 4 are rendered by cooperation of hardware and software components, but the specific configuration of the hardware component and the specifications of the software component are not limited, and the detailed configurations thereof can be changed as desired.

Furthermore, the first scanner 111 and second scanner 112 in the foregoing embodiment are described as using RGB light sources to enable monochrome or color scanning, but a configuration using an infrared light source to enable infrared scanning is also conceivable. Furthermore, because magnetic ink has higher infrared absorbance than normal ink, infrared light can be used to read only the characters printed in magnetic ink, thereby enabling optically reading the MICR text in the MICR area MA efficiently.

In the foregoing embodiment reading by the magnetic head 34 precedes scanning by the first scanner 111 and second scanner 112, but scanning by the first scanner 111 and second scanner 112 could precede reading by the magnetic head 34. In this configuration the location of the MICR area MA containing the MICR text can be determined from the results of an OCR process, and reading by the magnetic head 34 can be controlled accordingly. Furthermore, because the area where the MICR information is recorded can be easily identified using infrared scanning, the area read by the magnetic head 34 can be controlled accordingly.

The foregoing embodiment describes the invention applied to a flatbed scanner that conveys the recording medium S horizontally, but the invention is not so limited and can obviously be applied to a device with a transportation path that conveys recording media S such as checks and slips standing vertically on edge.

The foregoing embodiment also describes a dot impact printer 10 having an optical reader 110, but the invention is not so limited and can obviously be applied to other configurations having an optical reading unit comparable to the optical reader 110 disposed to an inkjet printer, thermal printer, or laser printer, for example. Yet further, the invention is not limited to devices that are used as a stand-alone printer, and configurations having an optical reading unit comparable to the optical reader 110 disposed in another device (such as an ATM (automated teller machine) or CD (cash dispenser)) are also conceivable.

Yet further, the invention is not limited to configurations rendering an optical reader 110 in unison with a device that records text or images on paper or other recording medium, and can obviously be applied to a wide range of other devices including stand-alone scanners and photocopiers.

The processes executed by the optical reading device described above can also be rendered as a computer-executable program. This program can also be provided stored on a storage medium such as a hard disk drive, an optical disc, a magneto-optical disc, or flash memory.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. An optical reading device comprising:

a transportation unit that conveys a medium to be scanned;

an optical reading unit that has a linear image sensor with photodetectors arrayed perpendicularly to the transportation direction of the medium, optically senses the medium conveyed by the transportation unit by the linear image sensor, and sequentially outputs the detection values of the photodetectors from either end of the linear image sensor; and an image processing unit that generates scanned image data based on the detection values read by the optical reading unit, adds thereto information describing the relationship between the scanning sequence of the photodetectors of the linear image sensor and the pixel order of the scanned image data, and outputs to another device.

2. The optical reading device described in claim 1, wherein:

the image processing unit includes a detection value processing unit that generates pixel data based on the photodetector detection values output from the optical reading unit, and outputs the generated pixel values in the same order or the reverse order as the photodetector reading sequence of the linear image sensor, and an image generating unit that generates the scanned image data based on the pixel data output by the detection value processing unit.

3. The optical reading device described in claim 1, wherein:

the optical reading unit has disposed on opposite sides of the transportation path a first scanning unit that reads one side of the medium and that has the linear image sensor and a second scanning unit that reads the other side of the medium and that has a second linear image sensor with photodetectors arrayed perpendicularly to the transportation direction of the medium; and the image processing unit adds information describing the relationship between the scanning sequence of the photodetectors of the linear image sensor in the first scanning unit and the order of the pixels in the scanned image data to the scanned image data from the first scanning unit, adds information describing the relationship between the scanning sequence of the photodetectors of the second linear image sensor in the second scanning unit and the order of the pixels in the scanned image data to the scanned image data from the second scanning unit, and outputs to the other device.

4. The optical reading device described in claim 1, wherein:

the image processing unit has a storage unit that stores the generated scanned image data, and reads from the storage unit and outputs to the other device a scanned image of the area where scanning was completed even if scanning another area is not completed when one or a plurality of areas set in the scanning range of the optical reading unit is scanned by the optical reading unit and scanning at least one area ends.

5. The optical reading device described in claim 1, further comprising:

a response control unit that sends information describing the scanning direction of the photodetectors of the linear image sensor to the other device in response to a request from the other device.

6. The optical reading device described in claim 1, wherein:

the information further includes at least one of (i) information denoting the top or bottom of the medium, or (ii) a conveyance direction of the medium.

7. An optical reading device control method that controls an optical reading device, the optical reading device including a transportation unit that conveys a medium to be scanned, and an optical reading unit that has a linear image sensor with photodetectors arrayed perpendicularly to the transportation direction of the medium, optically reads the medium conveyed by the transportation unit by the linear image sensor, and sequentially reads and outputs the detection values of the photodetectors from either end of the linear image sensor, the control method comprising steps of:

generating scanned image data based on the detection values read by the optical reading unit;

adding to the scanned image data information describing the relationship between the scanning sequence of the photodetectors of the linear image sensor and the pixel order of the scanned image data; and outputting to another device.

8. The optical reading device control method described in claim 7, further comprising steps of:

generating pixel data based on the photodetector detection values output from the optical reading unit;

outputting the generated pixel values in the same order or the reverse order as the photodetector reading sequence of the linear image sensor; and generating the scanned image data based on the output pixel data.

9. The optical reading device control method described in claim 7, wherein the optical reading unit has disposed on opposite sides of the transportation path a first scanning unit that reads one side of the medium and that has the linear image sensor and a second scanning unit that reads the other side of the medium and that has a second linear image sensor with photodetectors arrayed perpendicularly to the transportation direction of the medium, the control method further comprising steps of:

adding information describing the relationship between the scanning sequence of the photodetectors of the linear image sensor in the first scanning unit and the order of the pixels in the scanned image data to the scanned image data from the first scanning unit;

adding information describing the relationship between the scanning sequence of the photodetectors of the second linear image sensor in the second scanning unit and the order of the pixels in the scanned image data to the scanned image data from the second scanning unit; and outputting to the other device.

10. The optical reading device control method described in claim 7, wherein:

the image processing unit has a storage unit that stores the generated scanned image data, and reads from the storage unit and outputs to the other device a scanned image of the area where scanning was completed even if scanning another area is not completed when one or a plurality of areas set in the scanning range of the optical reading unit is scanned by the optical reading unit and scanning at least one area ends.

11. The optical reading device control method described in claim 7, further comprising a step of:

sending information describing the scanning direction of the photodetectors of the linear image sensor to the other device in response to a request from the other device.

12. The optical reading device control method described in claim 7, wherein:

the information further includes at least one of (i) information denoting the top or bottom of the medium, or (ii) a conveyance direction of the medium.

13. A non-transitory computer-readable recording medium that stores a program that can be executed by a control unit that controls an optical reading device that has a transportation unit that conveys a medium to be scanned, and an optical reading unit that has a linear image sensor with photodetectors arrayed perpendicularly to the transportation direction of the medium, optically senses the medium conveyed by the transportation unit by the linear image sensor, and sequentially outputs the detection values of the photodetectors from either end of the linear image sensor, the program enabling the control unit to execute steps of:

generating scanned image data based on the detection values read by the optical reading unit;

adding to the scanned image data information describing the relationship between the scanning sequence of the photodetectors of the linear image sensor and the pixel order of the scanned image data; and outputting to another device.

14. The non-transitory computer-readable recording medium as described in claim 13, wherein:

the information further includes at least one of (i) information denoting the top or bottom of the medium, or (ii) a conveyance direction of the medium.

* * * * *